United States Patent Office 3,050,551
Patented Aug. 21, 1962

3,050,551
12-ACETOXY-1-HYDROXY-9-OCTADECENE AND METHOD FOR PRODUCING THE SAME
Martin Jacobson, Silver Spring, Md., assignor to the United States of America as represented by the Secretary of Agriculture
No Drawing. Original application Aug. 11, 1960, Ser. No. 49,108. Divided and this application Mar. 1, 1961, Ser. No. 104,493
2 Claims. (Cl. 260—488)
(Granted under Title 35, U.S. Code (1952), sec. 266)

A non-exclusive, irrevocable, royalty-free license in the invention herein described throughout the world for all purposes of the United States Government, with the power to grant sub-licenses for such purposes, is hereby granted to the Government of the United States of America.

This invention relates to a new potent synthetic lure for the male gypsy moth, means of using the lure and a method of synthesizing it. The lure can be used for the purpose of detecting gypsy moth infestations and thereafter controlling such detected infestations by conventional means, or it can be useful for direct control when used in combination with an agent toxic to the insect.

The gypsy moth, *Porthetria dispar* (L.) does serious damage to forest and shade trees in the New England and eastern New York State areas of the United States. The caterpillars, or larvae, of these moths eat the leaves of trees and thereby retard the growth and otherwise weaken the trees. The death of trees may be caused by a single or repeated defoliations, e.g. white pines and some other conifers die almost always after a single stripping of the foliage. Based on a twenty-year study, the losses in hardwood trees killed have been estimated to run in the tens of millions of dollars.

This serious insect pest has been prevented from spreading from infested areas to other susceptible forest lands of the United States by employing a unique means to detect the insect, followed by spraying with a toxicant therefor, such as DDT, in those areas where the moth is found. Spraying is usually done by airplane. To survey extensive areas for detecting the presence of the moth, traps are baited with the natural female sex lure which attracts adult male moths from distances of ½ mile or more. The lure is obtained by clipping the last two abdominal segments of the virgin female moth, extracting the segments with benzene and processing the extract chemically to stabilize the lure. This is an expensive procedure since large numbers of female pupae have to be collected in the field and the moths allowed to emerge before the segments can be clipped. Furthermore, emergence of moths from the pupae usually runs only 40 to 60%. A very serious difficulty arises from the fact that, as the gypsy moth population diminishes, it becomes increasingly difficult to obtain the female pupae needed for lure production. To eliminate this difficulty a substitute is needed to replace the natural attractant.

One object of this invention is, therefore, to provide a novel substitute for the natural attractant. Another object is to provide a method for synthesizing a substitute for the natural attractant which is effective in minute quantities when used according to the present surveying methods. Still another object is to provide a method for synthesizing a new substitute for the natural attractant which is at least as effective as the natural attractant when used in present trapping procedures. Other objects and advantages will become apparent to those skilled in the art from the description of the invention which follows:

In accordance with the present invention, it has been discovered that the compound, 12-acetoxy-1-hydroxy-9-octadecene, having the formula $$CH_3(CH_2)_5CHCH_2CH=CH-(CH_2)_7CH_2OH$$
$$\underset{\underset{O}{\overset{\|}{C}}}{\overset{O-}{|}}-CH_3$$

will attract the male gypsy moth when used in concentrations as low as 0.000002 gram per cartridge.

The above-named compound is novel. In general, it can be prepared by acetylating ricinoleyl alcohol with acetyl chloride to produce 1,12-diacetoxy-9-octadecene, removing the HCl formed in the reaction with an excess of a weak base, neutralizing excess base with a dilute aqueous solution of an alkali metal hydroxide, and then selectively saponifying the diacetate with an alcoholic alkali metal hydroxide. The selective saponification removes only the primary acetoxy group (that in the 1-position) to yield the desired 12-acetoxy-1-hydroxy-9-octadecene. A detailed description of a preferred method follows:

EXAMPLE

Twelve grams of ricinoleyl alcohol, prepared by reducing ricinoleic acid with lithium aluminum hydride, was dissolved in 50 ml. of anhydrous benzene and acetylated, while cooling in ice, with 7.32 grams of acetyl chloride (10% excess) in 20 ml. anhydrous benzene, using 8.5 ml. of pyridine as an acid acceptor. The mixture was refluxed for 2 hours, cooled, and washed successively with 5% hydrochloric acid, 5% potassium hydroxide, and water, dried, and distilled [B.P. 180° (1.3 mm. Hg), refractive index ($n_D^{25}$) 1.4519] to give the diacetate (62% yield). To 8 grams of diacetate was added 1.2 grams potassium hydroxide in 3 ml. of water and 15 ml. of 95% ethanol, and the mixture was refluxed for 1.5 hours. The cooled liquid was diluted with several volumes of water, and extracted with several portions of ether. After washing the combined extract with water, the ether solvent was evaporated off and the 12-acetoxy-1-hydroxy-9-octadecene (90% yield) was distilled [B.P. 182° (0.5 mm. Hg), refractive index ($n_D^{25}$) 1.4607]. Calculated for $C_{20}H_{38}O_3$: C=73.55%, H=11.74%. Found: C=73.36%, H=11.70%.

A novel feature of the foregoing synthesis is the saponification step in which the primary acetoxy group is saponified without concurrent saponification of any of the 12-acetoxy group.

The effectiveness of 12-acetoxy-hydroxy-9-octadecene as an attractant for the male gypsy moth was determined in comparative field tests using traps baited with the compound and following the same procedure as used in actual surveys.

The trap may be baited in various ways. In one procedure, a piece of filter paper, cloth, or other absorbent material, is impregnated with the attractant and placed within a hollow cylindrical can (7 inches long and 4 inches in diameter), each end of which is capped with a cardboard cone having a hole in its center to allow the male gypsy moth to enter. A sheet of cardboard lines the inside of the can and is covered on its inside surface with a sticky material which prevents the escape of the moth. Such a trap is disclosed on page 697 in the article entitled "The Gypsy Moth" by John M. Corliss, published in the Yearbook of Agriculture (Insects) of the United States Department of Agriculture for 1952, pages 694–698. The aforedescribed trap is substantially identical with the trap depicted on page 697 of this article with the sole modification that it utilizes cardboard cones instead of screen wire cones. Another such trap, this one using cardboard cones, is depicted on page 81 in the article entitled "Portugal Aids the United States in Fighting the Gypsy Moth" by James O. Howard, published in Foreign Agriculture issued by the Foreign Agricultural Service of the United States Department of Agriculture, vol. 17, No. 4, April 1953, pages 81–83.

After ascertaining the number of male gpysy moths thus trapped and thereby determining if infestation of the field exists, steps for controlling the infestation can accordingly be then taken, for example, by conventional spyraying of the filed with a gypsy moth toxicant, such as DDT. Other agents toxic to the moth can also be used directly with the lure, the lure serving to bring the moth in contact with the toxicant.

The effectiveness of the attractant of this invention has been demonstrated by tests in the field and in the laboratory. Results of a 2-week test in the field are given in the following table. In carrying out field tests the attractant is placed on a filter paper cartridge of the trap described in the article by J. O. Howard mentioned above. The traps are exposed during the flight season of the moth. Potency of the attractant is determined by comparing the catch of the attractant with that obtained wih the natural lure.

Table 1

| Chemical | Concentration, grams/cartridge | No. of Male Moths Caught (15 days) |
|---|---|---|
| 12-Acetoxy-1-hydroxy-9-octadecene | 0.000025 | 555 |
|  | 0.000010 | 503 |
|  | 0.000005 | 588 |
|  | 0.000002 | 415 |
| Natural lure | (12 female Tips) | 498 |
| Blank |  | 0 |

The high potency of 12-acetoxy-1-hydroxy-9-octadecene is illustrated by its ability to catch more moths than the natural lure at the remarkably low concentration of 5 micrograms per trap.

Laboratory tests using the procedure described by B. C. Block on page 172 of the February 1960 issue of the Journal of Economic Enthomology, agreed with results shown in the table.

The attractant of the invention can be used in actual practice in the field in different ways as is known in the art. It can be formulated with other materials or impregnated on a carrier or used in traps or similar devices different from the one described above. For example, it has been used in the presence of lindane, an insecticide, to trap moths.

This application is a division of application Serial No. 49,108, filed August 11, 1960, now Patent No. 3,018,219.

Having thus described my invention, what is claimed is:
1. 12-acetoxy-1-hydroxy-9-octadecene.
2. A method for preparing 12-acetoxy-1-hydroxy-9-octadecene which comprises reacting ricinoleyl alcohol with acetyl chloride to produce 1,12-diacetoxy-9-octadecene and selectively saponifying said diacetoxy compound by refluxing with an alcoholic alkali metal hydroxide to obtain 12-acetoxy-1-hydroxy-9-octadecene.

References Cited in the file of this patent
UNITED STATES PATENTS

| | | |
|---|---|---|
| 2,102,825 | Woodhouse et al. | Dec. 21, 1937 |
| 2,307,047 | Katzman et al. | Jan. 5, 1943 |
| 2,941,011 | Hagemeyer et al. | June 14, 1960 |